(12) United States Patent
Bouvet et al.

(10) Patent No.: US 9,648,067 B2
(45) Date of Patent: May 9, 2017

(54) RECEPTION OF A DIGITAL CONTENT IN TRICK MODE

(75) Inventors: Eric Bouvet, Montreuil le Gast (FR); Gérard Babonneau, Thorigne Fouillard (FR)

(73) Assignee: Orange, Paris (FR)

( * ) Notice: Subject to any disclaimer, the term of this patent is extended or adjusted under 35 U.S.C. 154(b) by 530 days.

(21) Appl. No.: 13/641,179

(22) PCT Filed: Apr. 12, 2011

(86) PCT No.: PCT/FR2011/050831
§ 371 (c)(1),
(2), (4) Date: Oct. 15, 2012

(87) PCT Pub. No.: WO2011/128574
PCT Pub. Date: Oct. 20, 2011

(65) Prior Publication Data
US 2013/0036204 A1    Feb. 7, 2013

(30) Foreign Application Priority Data
Apr. 15, 2010  (FR) ..................... 10 52890

(51) Int. Cl.
*G06F 15/16*    (2006.01)
*H04L 29/06*    (2006.01)

(52) U.S. Cl.
CPC ................ *H04L 65/4092* (2013.01)

(58) Field of Classification Search
CPC .......... H04N 21/6587; H04N 21/2387; H04N 21/2343; H04N 21/8455; H04N 21/472; H04N 21/47202; H04N 21/47217; H04N 21/47208; H04N 5/783; H04L 65/4092
See application file for complete search history.

(56) References Cited

U.S. PATENT DOCUMENTS

| 7,757,214 B1* | 7/2010 | Palczak et al. ............... 717/121 |
| 2002/0049610 A1* | 4/2002 | Gropper ................ G06Q 30/02 705/1.1 |
| 2006/0037057 A1 | 2/2006 | Xu |
| 2006/0056801 A1* | 3/2006 | Suneya .......................... 386/68 |

(Continued)

FOREIGN PATENT DOCUMENTS

CN         101686370 A       3/2010

OTHER PUBLICATIONS

English Translation of Office Action issued for CN 201180030224.1 (Nov. 4, 2014).

*Primary Examiner* — Dustin Nguyen
*Assistant Examiner* — Austin Moreau
(74) *Attorney, Agent, or Firm* — Drinker Biddle & Reath LLP (57) ABSTRACT

A terminal receives a digital content which is transmitted in the form of a data stream in a network. This digital content is received by the terminal with a reception throughput, a nominal rendering time being associated with the digital content. Activation of a trick mode corresponding to a modification of the nominal rendering time according to a modification factor associated with the trick mode is detected on the terminal. Data to be requested are then determined according to the modification factor and according to a value representative of reception throughput. The data are then requested from the network and the requested data are received.

11 Claims, 5 Drawing Sheets

(56) References Cited

U.S. PATENT DOCUMENTS

| | | | |
|---|---|---|---|
| 2007/0101012 A1 | 5/2007 | Li et al. | |
| 2007/0271388 A1* | 11/2007 | Bowra | H04L 65/602 |
| | | | 709/231 |
| 2008/0148327 A1* | 6/2008 | Xu | H04N 7/17336 |
| | | | 725/105 |
| 2009/0268811 A1* | 10/2009 | Yoshimasu | 375/240.12 |
| 2010/0135636 A1* | 6/2010 | Zhang et al. | 386/68 |
| 2011/0131618 A1* | 6/2011 | Hasek | 725/89 |

* cited by examiner

RECEPTION OF A DIGITAL CONTENT IN TRICK MODE

CROSS-REFERENCE TO RELATED APPLICATIONS

This application is the U.S. national phase of the International Patent Application No. PCT/FR2011/050831 filed Apr. 12, 2011, which claims the benefit of French Application No. 1052890 filed Apr. 15, 2010, the entire content of which is incorporated herein by reference.

FIELD

The present invention relates to the reception of digital content, such as a video or video with sound track, by a terminal, from a communications network of the Internet, or IP for 'Internet Protocol', type and, more particularly, the implementation of a 'trick mode'.

BACKGROUND

Video on demand is a service offered by a server which allows a user of a terminal to watch a film of his choice from amongst a predetermined list. More precisely, for this purpose, the terminal sends a request to the server indicating the chosen film, and he receives in return a digital data stream relating to this film. In this context, the terminal may wish to modify the speed of display of the film during the reception, by increasing this speed for an accelerated viewing or by reducing it for a viewing in slowed down mode, or reversing the direction of reading for a fast return. The modification of this speed is based on the management of modes referred to as 'trick modes'.

The document US20060037057 provides a management procedure for these trick modes in the context of reception of a video. In this document, when a terminal wishes to increase the speed of display of the video, it sends a request of the GET type according to the HTTP protocol which comprises physical addresses of the images to be displayed in the accelerated mode. Then, the server transmits to the terminal the digital data corresponding to these physical addresses.

This management of the trick modes is based on the physical addresses of the images in the video and, for this reason, notably allows the partial selection of the images of the video to be displayed. When an increase in the speed of display is requested, the user of the terminal views only a part of the content of the video, and in this sense, the speed of display is increased with respect to a duration of display of the video under the same network conditions without the trick mode.

However, in certain cases, the duration of display might not correspond to the acceleration requested via the trick mode with respect to the nominal duration of the video. For example, if an acceleration of four times the speed of display for the whole duration of the video is requested, it is possible for the total duration of display of the video in this accelerated mode to be much longer than the nominal duration of the video (in other words at the speed of 24 or 25 images per second) divided by four.

Thus, in the context of the document US20060037057, the viewing four times faster of a video can take substantially longer than a quarter of the duration of the video under certain network conditions, notably when the data transmission rate over the network is very low.

SUMMARY

The present invention is aimed at improving the situation.

A first aspect of the present invention provides a method for management of reception in a terminal of a digital content which is transmitted in the form of a data stream over a network;

said digital content being received by said terminal at a representative value of reception rate;

a nominal reproduction duration being associated with the digital content;

said method for reception management comprising the following steps in the terminal:

/a/ detect the activation of a trick mode corresponding to a modification of the nominal reproduction duration according to a modification factor associated with said trick mode;

/b/ determine data to be requested as a function, on the one hand, of the modification factor and, on the other hand, of the representative value of reception rate;

/c/ request said data from the server; and

/d/ receive the data requested.

No limitation is attached to the type of terminal used, nor even to the type of transmission network. The terminal can for example be a PC, a mobile telephone or an STB (for 'Set Top Box') or again a connected television.

Nor is any limitation attached to the terms 'digital content'. A digital content can notably correspond to a series of images, to a video or, more generally, to any type of multimedia content which can be transmitted over the network in question.

In the present context, a terminal is adapted for receiving a digital content and for reproducing it. The reproduction of the digital content received in the form of data consists in providing, in a terminal, the digital content in a form accessible to a user of the terminal. For example, data received corresponding to a video are reproduced in the terminal in the form of a display of the corresponding video with its associated sound track.

In the present invention, upon detection of a trick mode, the data to be requested in order to implement this trick mode are determined. No limitation is attached to the means implemented for triggering a trick mode. It may for example be that a user activates a command which triggers the detection of a trick mode in the terminal Starting from the triggering of a trick mode, the data received can be ignored in the terminal. The terminal may therefore be programmed to request from the server an interruption in the transmission of the data stream as soon as a trick mode is detected. It is also perfectly possible for the server to stop transmitting the data stream upon reception of a first request for data from the terminal. This aspect is not a subject of the present invention.

The 'nominal reproduction duration' refers to the duration, or the period of time, necessary for delivering to a user a nominal reproduction of a digital content. In the context of a video, it is conventional for example to consider that the reproduction is carried out at a speed of 24 or 25 images per second, the nominal reproduction duration being a function of the number of images in the digital content considered as complete.

The term "trick mode" is understood here to mean any change in the nominal reproduction duration of the digital content with a modification factor which can allow an increase in the nominal reproduction duration ('slowed down') or a decrease ('fast forward'). In the case of a 'fast forward', the duration of the nominal reproduction is modified by modification of the digital content into a partial digital content. Thus, only a part of the digital content is taken into account, while at the same time complying with the modification factor which determines a reproduction duration associated with the partial digital content. It may be advantageous to implement an embodiment of the present invention to provide a slowed down reading rate in the case where the transmission network is so slow that it does not allow a nominal reading rate.

A modification factor can be an acceleration factor aimed at reducing the nominal reproduction duration or again a deceleration factor aiming to increase the nominal reproduction duration.

In this context of trick mode management, a representative value of reception rate in the terminal can be taken into account here in order to be able to guarantee that the modification of the nominal reproduction duration corresponds to the modification factor associated with the trick mode.

Here, the term 'reception rate' is understood to mean the rate at which the terminal receives data transmitted over the network.

Here, a representative value of the reception rate is a value which varies over time as a function of the variation over time of the reception rate of the terminal. This representative value may for example correspond to the value of reception rate in the terminal or else correspond to the duration of reception of data, which, depending on the size of the data, indicates the reception rate.

It should be noted here that, in the prior art, it is not possible to guarantee that the modification of the reproduction duration of the digital content corresponds to the modification factor associated with the trick mode. Indeed, according to the prior art, in the context of a video requested in accelerated mode for example, the user will be provided with a partial view of the video, by selecting images from amongst all the images of the video on the basis of physical spacing of the images within the digital content. Under such conditions, the user is able to accelerate the viewing of the video with respect to the viewing that he would have in a non-trick mode since he only sees one image out of a few images. However, if the reception rate of the terminal is slow, the viewing in accelerated mode does not guarantee a reduction in the viewing time by the desired modification factor. Indeed, according to the prior art, the factor of the trick mode is applied with respect to a potential reproduction duration without trick mode, in other words with respect to the reproduction that could be delivered without trick mode to the user at the same time and under the same conditions of reception, but not with respect to the nominal reproduction duration. Thus, if the potential reproduction duration over a period of time is twice as great as the nominal reproduction duration, the user who wishes to view a video four times faster for example over this period of time, will only be able to view it approximately twice as fast. Under such conditions, the user may be frustrated to have to wait substantially longer than expected for playing the video in accelerated mode.

Thus, in the prior art, the reproduction duration viewable by the user is dependent on the conditions of reception, whereas, in an embodiment of the present invention, since the representative value of reception rate is taken into account, this allows the system to be adapted in such a manner that the modification factor of the trick mode is applied with respect to the nominal reproduction duration, rather than with respect to a reproduction duration which would be dependent on the conditions of reception in certain cases of low data rate, such as in the prior art. In a simplified fashion, according to the prior art, when the user triggers a trick mode for acceleration by 4 of a video, about one quarter of the images are displayed. Under these conditions, if the reception rate is too slow in the terminal, the display of a quarter of the images does not allow the reproduction duration of the video to be reduced by a quarter.

Advantageously, thanks to the features of the present invention, it is possible to guarantee the fact that the modification of the nominal reproduction duration corresponds to the factor associated with the requested trick mode. Indeed, thanks to the fact that a representative value of reception rate is taken into account in the terminal, a reception method according to the present invention is capable of adapting the reproduction of the digital content according to the constraints of reception in such a manner that the reproduction duration effectively seen by the user of the terminal is modified in accordance with the factor associated with the requested trick mode.

It is for this purpose that the partial playing of the digital content will be adapted as a function of the representative value of the reception rate of the terminal in such a manner as to comply with the modification factor of the nominal reproduction which is requested by a user of the terminal. Thus, the user clearly sees that the acceleration requested is taken into account. Even if the conditions of reception of the terminal that he is using are poor, he will be able to obtain a viewing of the video in a period of time which corresponds to his expectation.

The user, who activates a trick mode in order to view a video n times faster with respect to a nominal reproduction duration, will effectively view this video n times faster, even in the case where the reception rate is so slow that it would not allow a nominal reproduction.

In one embodiment, the data corresponds to a series of reproduced units of the digital content,
time-stamp addresses being associated with said reproduced units of the series, each corresponding to a position in time of the reproduced unit with which it is associated within the series, relative to the nominal reproduction duration of the series;
the step /b/ being repeated n times, n being a natural integer, in an iteration of the step /b/ the determined data corresponds to a reproduced unit of the series having a time-stamp address deduced as a function of the modification factor, of the representative value of reception rate and of the time-stamp address of a reproduced unit corresponding to the data determined in the iteration of the preceding step /b/; and
at the step /c/, a request is sent comprising the time-stamp address deduced.

Here, it is considered that the digital content is a series of reproduced units. 'Reproduced units' is understood to mean data which can be grouped to form an element which can be made accessible to the user on the terminal. A reproduced unit may for example be an image. Indeed, an image is an elementary unit which can be made accessible to the user once reproduced by the terminal.

When the reproduced units correspond to images, the implementation of such a method may readily be applied to any type of series of images, whether this be a diaporama, or else a video, a theatre movie, etc. In the case where this series of images is a series of photos of a diaporama, the nominal reproduction duration may be defined in any given manner by its creator. In any case, the modification factor is applied with respect to this nominal reproduction duration initially attached to the digital content in question.

In this context, here, a time-stamp address will be associated with each reproduced unit of the series which indicates its position in time within the series, in other words with respect to the other reproduced units of this series. The data of the digital content is thus referenced against time, within the series, by assigning them with time-stamp addresses. More precisely, the time-stamp address of a reproduced unit corresponds to a time reference at which it should be displayed with respect to the other images of the digital content, in the context of a nominal reproduction duration of the digital content. For example, the time-stamp address 0 may be given to the first reproduced unit of the series and an address denoted $T_a$ to the following reproduced unit, where $T_a$ can then correspond to an interval of time separating the display of the two consecutive images for a nominal duration of the digital content. Generally, a video display takes place at a nominal speed of 25 images per second on television. In this case, the interval of time between two consecutive images is one twenty-fifth of a second. Thus, in such a context, each image of the video may be associated with a time-stamp address of the form $nT_a$, with n an integer, for n varying from 0 to p, p being such that $pT_a$ corresponds to the nominal reproduction duration of the video, in other words here the duration of display of the video.

Here, the step /b/ for determination of data to be requested will be repeated so as to determine all the reproduced units of the series of reproduced units to be reproduced for the user on his terminal during the activation of the trick mode. Each iteration of the step /b/ can therefore correspond to the selection of a reproduced unit. These successive iterations are advantageously carried out in a manner linked by the fact that the current iteration takes into account information obtained in the preceding iteration. Indeed, the current iteration is implemented on the basis of the time-stamp address of the reproduced unit previously selected in the preceding iteration. Thus, in the course of the implementation of an iteration of the step /b/, the following elements are taken into account:

representative value of reception rate;
modification factor for the trick mode; and
time-stamp address of the reproduced unit previously selected.

Thanks to these elements, it is possible to optimize the quantity of data to be requested with respect to the conditions of reception. On the basis of these elements, the duration of reception of the previously selected reproduced unit is known. The time-stamp address of the next reproduced unit to be selected can then be determined in an optimal manner by taking into account the modification factor for the trick mode.

The request for data made to the server can indicate the address or the time-stamp addresses of the selected reproduced units, the server then being capable of determining the data to be transmitted depending on the time-stamp addresses.

In one embodiment of the present invention, the data corresponds to a series of reproduced units of the digital content,
time-stamp addresses being associated with said reproduced units of the series, each corresponding to a position in time of the reproduced unit with which it is associated within the series, relative to the nominal reproduction duration of the series;

the step /b/ being repeated n times, n being a natural integer, in an iteration of the step /b/, the determined data corresponds to a reproduced unit of the series having a time-stamp address deduced as a function of the modification factor, of the representative value of reception rate and of the time-stamp address of a reproduced unit corresponding to the data determined in the iteration of the preceding step /b/; and the terminal has access to a file making each time-stamp address correspond to a physical address for the reproduced units of the series on the basis of the nominal reproduction duration; and at the step /c/, a request is sent comprising the physical address corresponding to the time-stamp address determined.

Here, the physical addresses of the data which are requested for the trick mode by the terminal will be directly supplied to the server. For this purpose, a correspondence file is provided that enables the time-stamp addresses to be made to correspond with respective physical addresses. Here, 'physical address' of a reproduced unit of the series is taken to mean a reference indicating the position of storage of the reproduced unit within the series.

This correspondence file can also indicate the sizes of the various reproduced units of the series.

In one embodiment, the representative value of reception rate is a fixed value; and
at the step /b/, a plurality of reproduced units is determined corresponding to the data to be requested; and
at the step /d/, the data corresponding to said plurality is indicated to the network.

Advantageously, in the case of a data rate of fixed value, or which may at least be considered as a fixed value, the terminal can dispose of the fixed rate representative value. It can then make an estimation of the duration of reception for any given reproduced unit of the digital content. It is also possible for the terminal to dispose of the size of the reproduced units.

By iterating the step /b/ in a recurrent manner, it is possible to successively select the most appropriate reproduced units, by taking into account at each iteration the duration of reception of the reproduced unit previously selected.

In another embodiment, the method furthermore comprises the following step:
/e/ repeat the steps /b/ to /d/ for as long as the trick mode is active;
at the step /d/ a duration of reception of reproduced unit corresponding to the data requested at the preceding step /c/ is measured; and
in which the representative value of reception rate for the following iteration of the step /b/ is the duration of reception measured at the preceding step /d/.

In this case, advantageously, it is possible to optimize the selection of the reproduced units to be requested for the trick mode, according to potential variations of the reception rate over time. For this purpose, the measurement is here included of the duration of reception of the reproduced unit received after selection in the iteration of the preceding step /b/. Then, on the basis of this duration of reception, which represents a reception rate, and of the time-stamp address of the reproduced unit previously received, a time-stamp address is determined for a reproduced unit to be received for the implementation of the trick mode.

In one embodiment, the reproduced units of the series having respective sizes, the method of management furthermore comprising the following steps after the step /d/:

calculate a rate value by dividing the size of the reproduced unit received at the step /d/ by the duration of reception measured at said step;

obtain a value of corrected rate by applying a filter; and determine the representative value of reception rate for the following iteration of the step /b/ on the basis of the value of corrected rate.

Here, by means of a low-pass filter, the representative value of determined reception rate, to be used at a next iteration of the step /b/, is therefore obtained. Such an implementation allows erroneous differences from abrupt variations in the reception of data to be avoided. Such can be the case, notably when the reproduced unit received is small. In this case, its duration of reception may cause errors with regard to the effective variations in rate. By filtering on the basis of preceding rates, themselves filtered, incorrect interpretations are avoided.

A second aspect of the present invention provides a terminal comprising means designed for implementing a method for management of reception according to the first aspect of the present invention.

A third aspect of the present invention provides a system for management of digital content comprising a terminal according to the second aspect of the present invention and a server capable of cooperating with this terminal.

A fourth aspect of the present invention provides a computer program comprising instructions for implementing the method according the first aspect of the present invention, when this program is executed by a processor.

A fifth aspect of the present invention provides a recording media on which is stored the computer program according to the fourth aspect of the present invention.

Other aspects, aims and advantages of the invention will become apparent upon reading the description of one of its embodiments.

BRIEF DESCRIPTION OF THE DRAWINGS

The invention will also be better understood with the aid of the drawings, in which.

DETAILED DESCRIPTION

Figure 1:
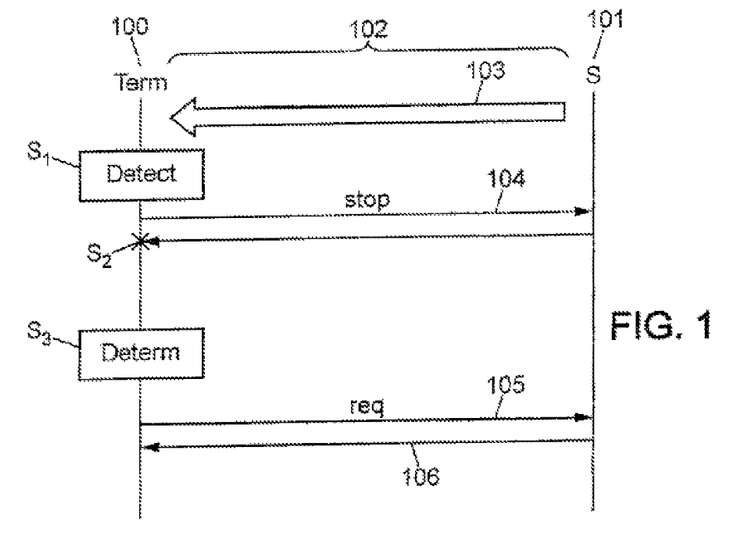
FIG. 1 illustrates the main steps of a method for management of reception of a digital content according to one embodiment of the present invention.

FIG. 1 illustrates a method for management of reception of a digital content according to one embodiment of the present invention. Such a method for reception management can be implemented in any type of communications network 102 comprising a server 101 designed to transmit at least one digital content and one terminal 100 designed to receive the digital content or contents transmitted by the server.

The terminal 100 receives a digital content from the server 101 via the communications network 102 according to a data stream 103. No limitation is attached to the means implemented for triggering the reception of a digital content in the terminal in the present invention. This digital content can notably be transmitted to the terminal by the server upon request or, alternatively, the digital content may be broadcast over the network, the terminal then receiving it within a broadcast context.

Then, during the reception of this data stream 103, at a step S1, the terminal detects the activation of a trick mode. This trick mode corresponds to a modification of the nominal reproduction duration according to a modification factor associated with the activated trick mode. Following this detection, at a step S2, the reception of the data stream 103 is halted. In the case where the terminal has initially requested the digital content, it can send a message 104 to the server 101 requesting the interruption of the transmission of the data stream 103. Subsequently, the transmission of the data stream is then halted. Alternatively, the step S2 can be carried out in the terminal 100 only, in other words the data stream 103 can still be transmitted but ignored in the terminal. In any case, starting from the step S2, the terminal no longer processes data from the stream 103.

Then, at a step S3, sets of data from the digital content to be requested are determined. For this purpose, advantageously, this is based on both the modification factor associated with the active trick mode, and also on a representative value of reception rate in the terminal. Thus, the data to be requested from the server may be adapted depending on the reception rate, so as to comply with the factor for modification of nominal reproduction duration associated with the active trick mode.

A request for at least the next data to be reproduced in the terminal is then able to be made by sending a request message 105 to the server 101.

Subsequently, the terminal receives the data previously requested in a message or several messages 106.

The fact that the reception rate is taken into account allows the terminal to reproduce for a user the data received over a period of time which is in accordance with the modification factor associated with the trick mode. The determination step S3 can be repeated throughout the implementation of the trick mode.

It should furthermore be noted that the data to be requested can be indicated to the server either by time-stamp addresses, in other words time references of the data within the digital content with respect to the nominal reproduction duration, or else by physical addresses, in other words physical references for the data within the digital content.

In the case where the data from the digital content is a series of reproduced units, it is advantageous to be able to select in a step-wise manner the reproduced units to be requested by reiterating the step S3 on the basis of information obtained in the preceding iteration. Thanks to this procedure, the quantity of units reproduced for the user may be optimized by allowing an optimized successive processing of the reproduced units received. In other words, generally speaking, by reiterating the unit selection successively and in a nested manner, the processing time relating to the reproduced unit previously requested may be taken into account for deciding to select the following reproduced unit.

In the following sections, by way of illustration only and for the sake of simplification, the digital content corresponds to a video. Thus, a series of reproduced units is a series of images to be reproduced at a nominal speed of 25 images per second. Also for illustration, the trick mode accordingly corresponds to a reproduction acceleration factor, in other words a video fast play mode with a modification factor denoted A (for Acceleration).

Figure 2:
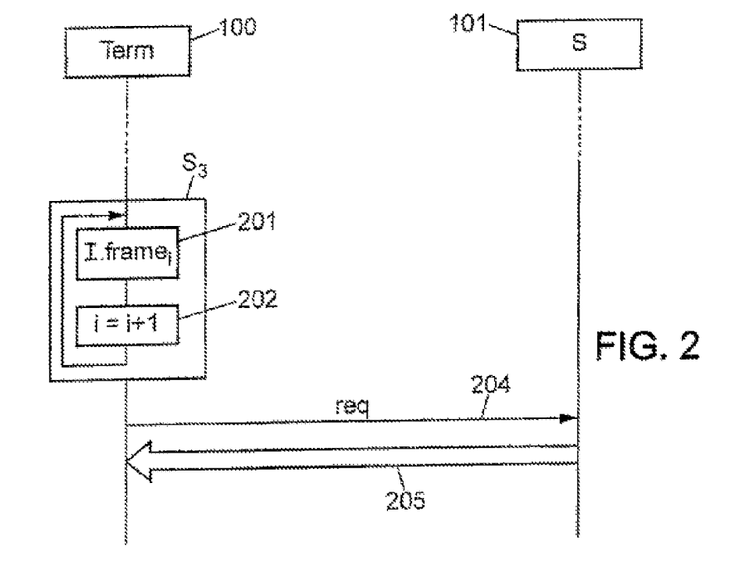
FIG. 2 illustrates a method for management of reception of a digital content by a terminal from a server according to one embodiment of the present invention in which a reception rate in the terminal is taken as a fixed rate.

FIG. 2 illustrates a method for management of reception of a digital content by a terminal 100 from a server 101 according to one embodiment of the present invention in which a reception rate in the terminal is taken as a fixed rate. In this case, it is advantageously possible to anticipate the data to be requested and, as a result, it is possible to request a series of data within a single request message destined for the server. Here, the representative value of reception rate is a fixed rate value denoted D.

Here, the step for determination of the data to be requested from the server and the steps that follow it are more precisely described. In one embodiment, in this context of fixed reception rate, at the determination step S3, the terminal 100 is responsible for obtaining time-stamp addresses identifying the images of the video to be requested according to the trick mode in order to supply them to the server.

In the context of implementation of a trick mode corresponding to a reduction in the nominal duration of reproduction of a video (in other words a video fast play), only a part of the images is displayed. However, according to some coding structures, it is not possible to decode certain images independently from one another. In one embodiment, the images displayed in trick mode correspond to images which can be decoded independently.

The images of a video are in general organized as GOPs ('Group Of Pictures'). The first image of a group is referenced I-frame (for 'Intra-coded frame') and can be entirely coded independently from the other images of this group. In the following, by way of illustration, in the context of the display of a video in 'fast play' mode, only the time-stamp addresses of the I-frame images will be considered. It should be noted that some coding structures of the 'Random Access Point' type allow decoding from images which are not of the I-frame type. In this case, such images can be used by the trick modes in an embodiment of the present invention.

In one embodiment, the method for management of reception is iterative, each iteration of the determination step of an image to be requested being based on the preceding determination step. In order to initiate this iteration, a first image is selected to be requested. The initial image chosen is not important at this stage. It may for example be considered that the initial image of the iterative method is the last image received prior to the detection of the activation of the trick mode S1.

At each step 201 for determination of an image, or else selection of an image, it is desired to select the image of the I-frame type, denoted I-frame$_i$, which can be displayed just after the preceding one in the fast play mode requested. For this purpose, the processing time for the preceding image is determined. It may, for example, be obtained as a function of the fixed rate D and of the size of the preceding image $S_i$, i being an index of the previously selected image, hence i representing the number of images of the I-frame type already selected for this video. Here, the size of the images of the video may be known by the terminal via any given means. It might notably be that, prior to the transmission of the video, the server transmits a file indicating certain characteristics of the video such as the size of the images.

In this case, the duration of reception $L_i$ (L for 'Latency', i being an index of the previously selected image) of the previously selected image $I_i$ verifies the following equation:

$$L_i = \frac{S_i}{D}$$

The images to be displayed in trick mode can then be concatenated in an optimal manner.

In order to select the images to be requested, time-stamp addresses are allocated to the images of the video.

The time-stamp address of the last image received prior to the activation of the fast play is denoted $T_{ref}$. The time-stamp addresses of the I-frame images of the video are denoted $T(I\text{-frame})_j$, where j is the index of the I-frame image of the video.

The time-stamp addresses of the I-frame images requested for the display of the trick mode are denoted $T(I\text{-frame},A)_k$, where k is the index of the I-frame image requested according to the trick mode associated with the factor A (for acceleration).

The latency (or duration of reception) of the requested I-frame image k being $L_k$, and given that the acceleration of the trick mode is A, the time-stamp address of the next image selected k+1 is given by the equation:

$$T(temp)_i = T_{ref} + A \times \sum_{k=1}^{i-1} L_k$$

where T(temp), corresponds to the address of an image of the video temporarily selected because it might not correspond to an image of the I-frame type.

Hereinabove, this therefore represents an intermediate selection step aimed at determining an image of any given type in the video according to one embodiment of the present invention. Then, an image of the I-frame type should subsequently be selected whose time-stamp address is close to the time-stamp address of the image selected here.

In one embodiment, it is therefore a question of searching for the time-stamp address T(I-frame), of an I-frame image such that:

$|T(temp)_i - T(I\text{-frame})_j| \leq |T(temp)_i - T(I\text{-frame})_{j+1}|$ $|T(temp)_i - T(I\text{-frame})_j| \leq |T(temp)_i - T(I\text{-frame})_{j-1}|$ Consequently, the time-stamp address of the I-frame image to be requested is $T(I\text{-frame})_j$. The value $T(I\text{-frame})_j$ is therefore given to the parameter $T(I\text{-frame},A)_k$.

Then, at a step 202, the index of the I-frame images to be requested is updated by incrementing it by the value 1.

This method allows the trick mode to be adapted to a rate that is substantially fixed. Indeed, such a selection of the I-frame images to be requested is appropriate for the substantially fixed rate. In the case where the reception rate is very slow and would not allow a nominal reproduction, when a fast play is requested, it is possible for a significant number of I-frame images to be ignored between two I-frame images displayed according to one embodiment. However, even under these difficult conditions of reception, the duration of display of the video is a duration corresponding to the acceleration requested. Then, in the case of a higher reception rate, one embodiment allows the display of a large number of I-frame images, and thus a smooth and detailed display of the trick mode.

Thanks to the assumption of a reception rate of a fixed value, it is advantageously possible to transmit a single message for requesting a plurality of images from the server. Under such conditions, the determination of the images may be accelerated and the trick mode service is then set up more quickly for the user.

In one embodiment of the present invention, the terminal requests the I-frame images selected by indicating their time-stamp addresses in a request message 204. In this case, the server is adapted for collecting the images on the basis of the time-stamp addresses. Such can be the case if the server is informed of the time-stamp address $T_{ref}$ of the image taken with reference to the start of the iterative determination method. Then, in response, the server sends a data stream 205 corresponding to the request 204.

Alternatively, it may be envisioned that the terminal indicates physical addresses of the images to be requested to the server. In this case, the terminal can dispose of a correspondence file designed to make the time-stamp addresses correspond to the physical addresses (in other words to the positions in memory) of the images relating to the digital content of the video. This embodiment is advantageously adapted to the existing HTTP protocol and allows the use of messages of the GET type 204 for generating the request for images from the server. Under these conditions, a terminal according to one embodiment remains compatible with the existing servers.

More precisely, a correspondence file associated with a video corresponds here to a file comprising information allowing the physical address of an I-frame image to be deduced based on its time-stamp address. It can also be envisioned for this correspondence file to comprise the size of each I-frame image together with general information relating to the video, such as the size and the duration of the video in its entirety for example. This correspondence file may, for example, be generated in association with the video and transmitted by the server to the terminal upstream of the transmission of the video with which it is associated.

Figure 3:
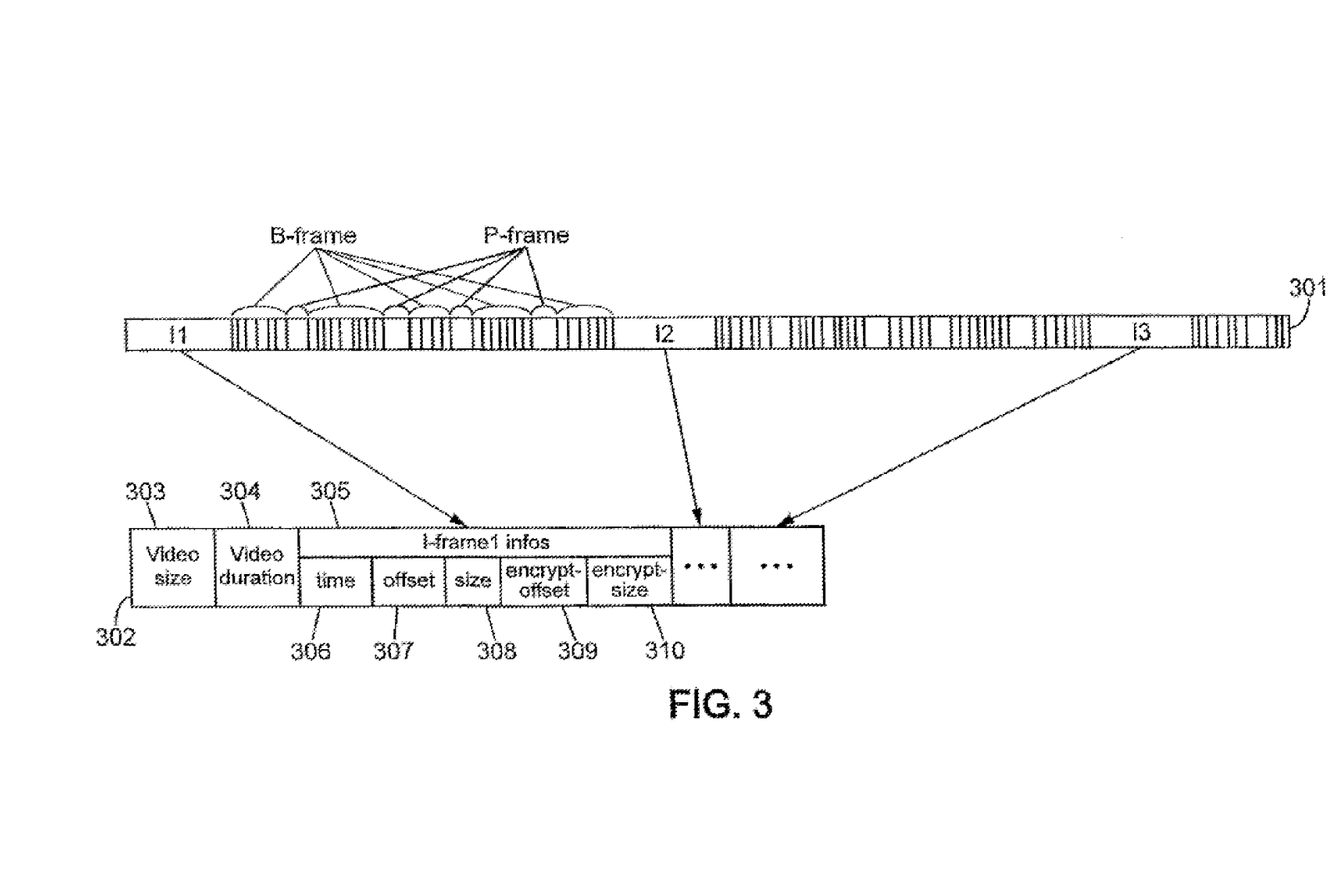
FIG. 3 illustrates one architecture of a correspondence file in an application to the video according to one embodiment of the present invention.

FIG. 3 illustrates one architecture of such a correspondence file in an application to the video according to one embodiment of the present invention.

An image structure 301 represents a structure of the video. Here, the video is coded according to the coding H.264. It comprises three types of images, namely I-frame images ($I_1$, $I_2$ and $I_3$), P-frame ('predicted coded picture') and B-frame ('bidirectional predictive coded picture') images. Only the I-frame images are taken into consideration for the display of a trick mode according to one embodiment.

These three types of images are organized into GOPs (groups of pictures) with different durations and sizes. Within the video, the I-frame images are coded at the head of each GOP.

A structure 302 represents one example of correspondence file according to one embodiment of the present invention. The correspondence file comprises, in a first header field 303, information relating to the size of the video and, in a second header field 304, information relating to the nominal reproduction duration of the video. Subsequently, each I-frame image of the video is described thanks to information stored in a field 305. This information indicates, for the I-frame image considered here, in other words $I_1$, a time-stamp address 306, a physical address 307, a size 308, together potentially with positions of unscrambling data 309 and a size of unscrambling data 310. This file therefore makes the physical and time-stamp addresses of each I-frame image of the video correspond.

Figure 4:
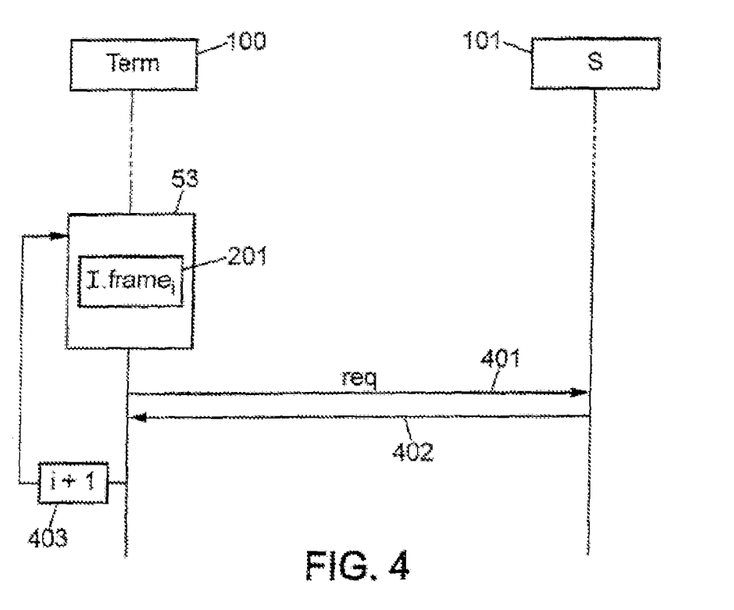
FIG. 4 illustrates a method for management of reception of a digital content by a terminal from a server according to one embodiment of the present invention in which the reception rate is considered as variable over time.

FIG. 4 illustrates a method for management of reception of a digital content by a terminal from a server according to one embodiment of the present invention in which the reception rate is considered as variable over time.

Here, the representative value of reception rate is therefore considered as a variable value. Under these conditions, the aim is to estimate over time a representative value of the reception rate as a function of a duration of reception of an image previously received. Preferably, this is based on the duration of reception of the image received following the preceding selection, but it could also be based on the duration of reception of an image selected in an iteration even further back. Indeed, in the case where the reception rate does not undergo large and rapid variations, a duration of reception of an image already received some time ago can also be a representative value of reception rate.

Accordingly, by way of non-limiting illustration, the duration of reception of the image which has just been received will be taken into consideration for selecting the next image to be requested.

Under these conditions, in an iteration i of the step S3, an I-frame$_i$ image is selected at a step 201 depending on the duration of reception of the preceding selected I-frame$_{i-1}$ image. This image is subsequently requested from the server via a request message 401. The server 101 responds to it by transmitting the data of the image requested via a message 402. The duration of reception of the I-frame$_i$ image is measured with a view to the next iteration of the step 201. Then, the index i is incremented at a step 403 in order to iterate the determination step for the next I-frame image to be displayed in the implementation of the trick mode.

As in the case of a variable reception rate, this involves the successive determination of the time-stamp addresses of the images to be requested as a function of the indicative value of reception rate. Then, either the images are requested by indicating the time-stamp addresses to the server, or they are requested by indicating the physical addresses. The same characteristics as those stated hereinabove in the context of the embodiment with fixed reception rate can be used again here.

In the case of the variable reception rate, the determination of the time-stamp addresses of the data to be requested for the trick mode reproduction is here based on the duration of reception of the image that has just been received. The following equation is then verified:

$$T(\text{temp})_i = T(\text{temp})_{i-1} + A * L_{i-1}$$

where $T(\text{temp})_i$ is the time-stamp address of the temporary image selected in the iteration i of the step /b/;
where $T(\text{temp})_{i-1}$ is the time-stamp address of the temporary image selected in the iteration i−1 of the step /b/;
A is the modification factor of the trick mode; and
$L_{i-1}$ is the duration of reception of the I-frame image requested in the iteration i−1.

This equality provides a temporary image which is used for choosing the I-frame image to be requested from the server (the nearest to the temporary image supplied by the equation hereinabove).

The following equality may also be applied for selecting the next image:

$$T(\text{temp})_i = T(I\text{-frame},A)_{i-1} + A * L_{i-1}$$

where $T(\text{temp})_i$ is the time-stamp address of the temporary image selected in the iteration i of the step /b/;
where $T(I\text{-frame},A)_{i-1}$ is the address of the image effectively selected in the iteration i−1 of the step /b/ so as to be requested from the server;
A is the modification factor of the trick mode; and
$L_{i-1}$ is the duration of reception of the I-frame image requested in the iteration i−1.

This embodiment is particularly effective in the case of a variable rate. Indeed, updating the reception rate upon each iteration, or at the very least regularly, allows the fine re-adjustment of the determination of the time-stamp or physical addresses of the data to be requested, and also allows compliance with the reproduction duration corresponding to the trick mode. These dispositions allow the quantity of data reproduced to be optimized, in other words to reproduce a maximum number of data values within the constraints of data reception rate and the reproduction duration of the digital content according to the trick mode.

It should be noted that, during the reception of a video, it is for example possible to alternate the reception management according to one embodiment considering the reception rate as a fixed value, as described with reference to FIG. 2, and the reception management according to one embodiment taking into consideration any potential variations in reception rate, as described with reference to FIG. 4. It may indeed be advantageous to combine these two embodiments under certain conditions of reception.

In the case where any potential variations in reception rate are taken into account, it may be relevant to filter the values representative of reception rate in order to protect the method against potential abrupt variations in duration of reception which would not be representative of the reception rate as a whole.

In this case, the reception rate can be calculated after each reception of an I-frame image to be requested by applying the following equation:

$$D_i = \frac{S_i}{L_i}$$

where $D_i$ is a value of reception rate relating to the reception of the previously requested I-frame image with index i;
where $S_i$ is a size of the I-frame image with index i;
where $L_i$ is the duration of reception of the I-frame image with index i.

Subsequently, a filter of the low-pass type is applied based on information relating to the preceding iteration. For this purpose, the following equation can notably be applied:

$$\overline{D_i} = \alpha \times \overline{D_{i-1}} + (1-\alpha) \times D_i$$

where $\overline{D_i}$ is an estimator of the reception rate relating to the I-frame image with index i;
where $\overline{D_{i-1}}$ is an estimator of the reception rate relating to the I-frame image with index i−1;
where α is a coefficient of the low-pass filter in the range between 0 and 1.

Subsequently, an estimated duration of reception is determined which can subsequently advantageously be taken into account in the next determination step i.

$$\overline{L_i} = \frac{S_i}{\overline{D_i}}$$

For example, an initial network rate estimation $D_0$ can be made, such that:

$$D_0 = 0$$

or $$D_0 = T_{video}/S_{video}$$

where $T_{video}$ is the total duration of the video and $S_{video}$ is the size of the video.

The following equation can then be verified:

$$T(\text{temp})_i = T(\text{temp})_{i-1} + A * \overline{L}_{i-1}$$

where $T(\text{temp})_i$ is the time-stamp address of the temporary image selected in the iteration i of the step /b/;
where $T(\text{temp})_{i-1}$ is the time-stamp address of the temporary image selected in the iteration i−1 of the step /b/;
A is the modification factor of the trick mode; and
$\overline{L}_{i-1}$ is the estimated duration of reception of the I-frame image requested in the iteration i−1.

This equality provides a temporary image which is used for choosing the I-frame image to be requested from the server (the nearest to the temporary image supplied by the equation hereinabove).

The following equality may also be applied for selecting the next image:

$$T(\text{temp})_i = T(I\text{-frame},A)_{i-1} + A * \overline{L}_{i-1}$$

where $T(\text{temp})_i$ is the time-stamp address of the temporary image selected in the iteration i of the step /b/;
where $T(I\text{-frame},A)_{i-1}$ is the address of the image effectively selected in the iteration i−1 of the step /b/ so as to be requested from the server;
A is the modification factor of the trick mode; and
$\overline{L}_{i-1}$ is the estimated duration of reception of the I-frame image requested in the iteration i−1.

Figure 5:
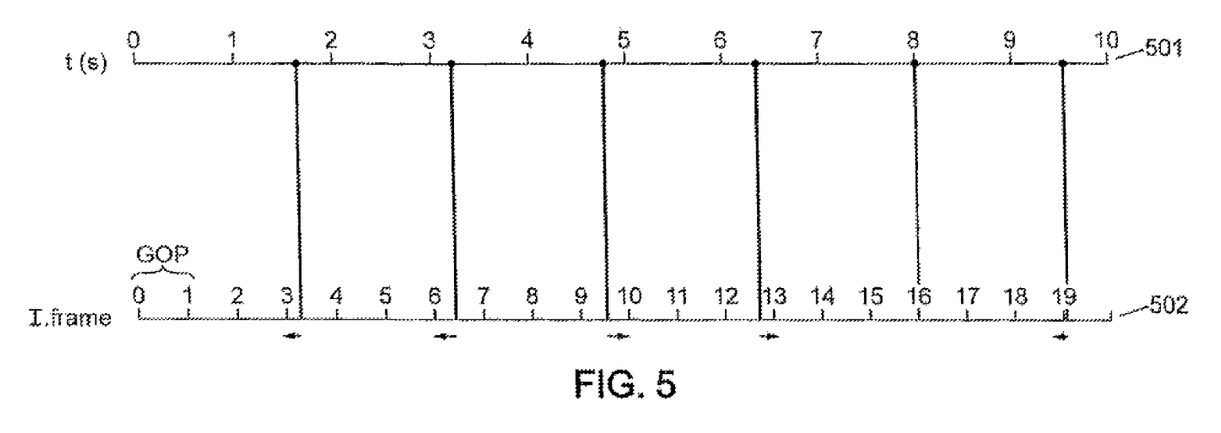
FIG. 5 illustrates in detail a method for management of reception of a video according to one embodiment of the present invention.

FIG. 5 illustrates in detail a method for management of reception of a video according to one embodiment of the present invention. Here, by way of example, the case of a video is considered whose nominal reproduction duration is 10 seconds, to which a modification factor is applied corresponding to an acceleration equal to 2. The nominal duration of the video is illustrated by a structure 502 shown schematically with reference to a time reference frame 501 on which each graduation indicates 1 s. The combination of the axes 501 and 502 supplies the time-stamp addresses of the I-frame images of the video in question. The schematically depicted structure 502 indicates the position in time of the images of the I-frame type in the video in question, I-frame$_i$ for going from 0 to 19. The other types of image are not shown.

The expected duration of display of the video in fast play mode is, in this example, 5 seconds.

It is considered that the size of the images of the I-frame type is constant at 200 kB and that the spacing between two consecutive I-frame images is here equal to 0.5 seconds. It is considered here that, if the reception rate of this video is greater than 1 MB/s, a nominal reproduction of the video is possible.

The following sections describe the application of a method according to one embodiment with a constant reception rate of value 250 kB/s which does not allow a nominal reproduction.

The size of an I-frame image being 200 kB, the duration of reception of an I-frame image is 0.8 seconds. Consequently, by taking into account the acceleration factor 2, the I-frame images can be selected which are those whose time-stamp addresses are the closest to the points in time: 0 s; 1.6 s; 3.2 s; 4.8 s; 6.4 s; 8 s and 9.6 s, by application of the following equation:

$$T(temp)_i = T_{ref} + A \times \sum_{k=1}^{i-1} L_k$$

It can be observed in the figure that the selection according to the equality hereinabove provides an image which does not correspond to an image of the I-frame type. The I-frame images are chosen which are situated closest in time to the images selected by the equality hereinabove.

With reference to the figure, the I-frame images to be requested are indexed by 0; 3; 6; 10; 13; 16; 19. In this case, 7 images of the I-frame type are selected out of 20 I-frame images of the video. This ratio is less than one image in two, which ratio could be obtained if the acceleration factor 2 were applied by selecting one image in two. However, the display of these 7 images advantageously allows the fact to be guaranteed that the duration of display in accelerated mode is half that in nominal mode.

Figure 6:
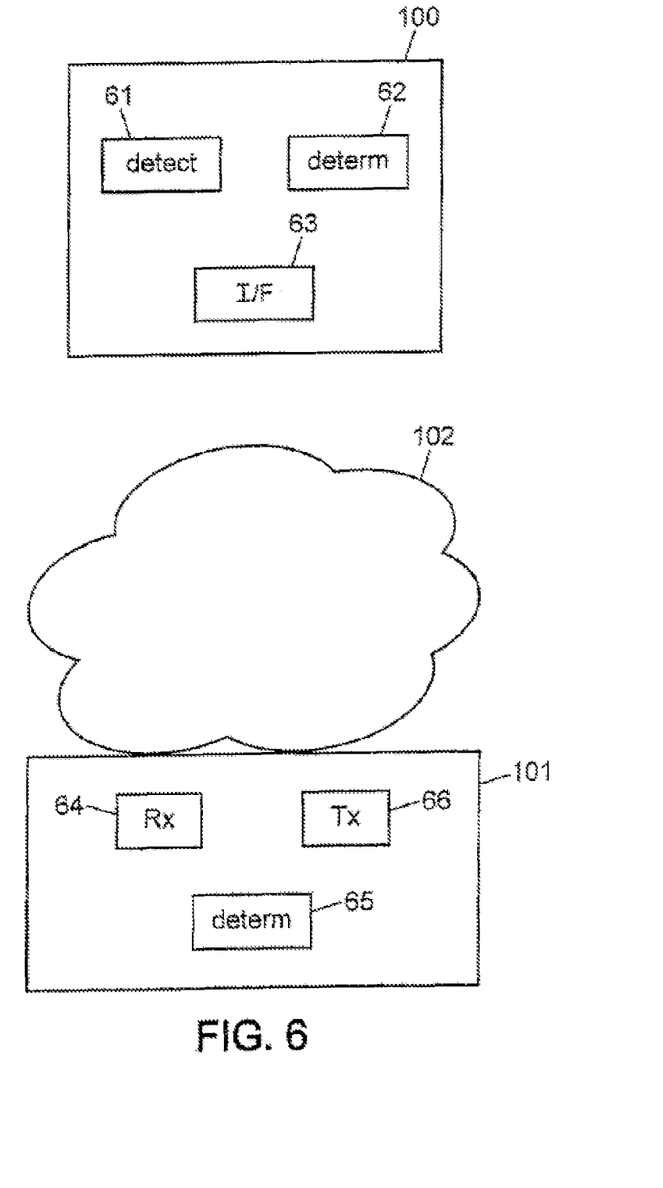
FIG. 6 illustrates one architecture of a receiving terminal and a corresponding server according to one embodiment of the present invention.

FIG. 6 illustrates a terminal and a server according to one embodiment of the present invention.

A terminal 100 comprises:
- a detection unit 61 designed to detect an activation of a trick mode corresponding to a modification of the nominal reproduction duration according to a modification factor associated with said trick mode;
- a determination unit 62 designed to determine data to be requested as a function, on the one hand, of the modification factor and, on the other hand, of a representative value of reception rate;
- an interface unit 63 with the network 102 designed to request said data; and
receive the requested data.

When the data corresponds to a series of reproduced units of the digital content, time-stamp addresses being associated with the reproduced units of the series, each corresponding to a position in time of the reproduced unit with which it is associated within the series, relative to the nominal reproduction duration of the series;
the determination unit 62 can then work by successive iterations, the data determined corresponding to a reproduced unit of the series having a time-stamp address deduced as a function of the modification factor, of the representative value of reception rate and of the time-stamp address of a reproduced unit corresponding to the data determined in the preceding iteration.

The terminal can also be provided with access to a file making each time-stamp address correspond to a physical address for the reproduced units of the series on the basis of the nominal reproduction duration; and
in this case, the interface unit 63 can generate a request comprising the physical address corresponding to the time-stamp address determined by the determination unit 62.

This terminal 100 can cooperate with a server 101 which comprises:
- a reception unit 64 designed to receive a request message 105 for data indicating addresses;
- a determination unit 65 designed to determine data of the digital content depending on the addresses indicated in the request message; and
- a transmission unit 66 designed to transmit 106 the data determined to said terminal.

It can be noted that the addresses used here can be either physical addresses or else time-stamp addresses. Indeed, at a first stage, the units to be requested are determined on the basis of their time-stamp addresses. Then, it is possible to include a conversion of the time-stamp addresses into physical addresses either in the terminal or else in the server. No limitation is attached to this aspect.

The invention claimed is:

1. A method for management of reception in a terminal of a digital content which is transmitted in the form of a data stream over a network; said digital content being received by said terminal with a reception rate; a nominal reproduction duration being associated with the digital content; the data corresponding to a series of reproduced units of the digital content, the reproduced units of the series have respective sizes, time-stamp addresses are associated with said reproduced units of the series, each corresponding to a time position of the reproduced unit with which it is associated within the series, relative to the nominal reproduction duration of the series;

said method for reception management comprising the following steps in the terminal:
/a/ detect the activation of a trick mode corresponding to a modification of the nominal reproduction duration according to a modification factor associated with said trick mode;
/b/ determine data to be requested depending on the modification factor and on a representative value of reception rate;
/c/ request said data from the network; and
/d/ receive the requested data,
repeat the steps /b/, /c/, and /d/ n times during the activation of the trick mode, n being a natural integer, and
at one iteration, after the step /d/, determine the representative value of reception rate for a following iteration of the step /b/ as a variable value calculated as a function of a duration of reception of the size of the reproduced unit measured at the preceding step /d/; and
at step /b/, determine the data corresponding to a reproduced unit of the series having a time-stamp address deduced as a function of the modification factor, of the representative value of reception rate and of the time-stamp address of a reproduced unit corresponding to the data determined in the iteration of the preceding step /b/; and
at the step /c/, a request comprising the deduced time-stamp address is sent.

2. The management method as claimed in claim 1,
wherein the terminal has access to a file making each time-stamp address correspond to a physical address for the reproduced units of the series on the basis of the nominal reproduction duration; and
at the step /c/, a request comprising the physical address corresponding to the determined time-stamp address is sent.

3. The method for reception management as claimed in claim 1,
wherein the representative value of reception rate is a fixed value; and
wherein, at the step /b/, a plurality of reproduced units corresponding to the data to be requested are determined; and at the step /d/, the data corresponding to said plurality is indicated to the network.

4. The management method as claimed in claim 1, further comprising the following step:
/e/ repeat the steps /b/ to /d/ as long as the trick mode is active;
wherein, at the step /d/, a duration of reception of a reproduced unit corresponding to the data requested at the preceding step /c/ is measured; and
wherein the representative value of reception rate for the following iteration of the step /b/ is the duration of reception measured at the preceding step /d/.

5. The method for reception management as claimed in claim 4,
wherein the reproduced units of the series having respective sizes, the management method further comprising the following steps after the step /d/:

calculate a data rate value by dividing the size of the reproduced unit received at the step /d/ by the duration of reception measured at said step;

obtain a value of corrected rate by applying a filter; and determine the representative value of reception rate for the following iteration of the step /b/ on the basis of the value of corrected rate.

6. The method of claim 1, further comprising:

/e/ use the requested data to guarantee that the modification of the nominal reproduction duration corresponds to the modification factor associated with the trick mode.

7. A terminal for management of the reception of a digital content transmitted in the form of a data stream over a network; said digital content being received by said terminal with a reception rate; a nominal reproduction duration being associated with the digital content; wherein the data corresponds to a series of reproduced units of the digital content, time-stamp addresses are associated with said reproduced units of the series, each corresponding to a time position of the reproduced unit with which it is associated within the series, relative to the nominal reproduction duration of the series;

said terminal carrying out a method comprising:

detecting an activation of a trick mode corresponding to a modification of the nominal reproduction duration according to a modification factor associated with said trick mode;

determining data to be requested as a function, on the one hand, of the modification factor and, on the other hand, of a representative value of reception rate;

requesting said data; and receiving the requested data, repeating the steps of determining data, requesting, and receiving n times during activation of the trick mode, n being a natural integer, at one iteration, after the step of receiving, determining the representative value of reception rate for a following iteration of the step of determining data as a variable value calculated as a function of a duration of reception of the size of the reproduced unit measured at the preceding receiving step; and at the step of determining data, determining the data corresponding to a reproduced unit of the series having a time-stamp address deduced as a function of the modification factor, of the representative value of reception rate and of the time-stamp address of a reproduced unit corresponding to the data determined in the iteration of the preceding step determining the data; and at the step of requesting the data, sending a request comprising the deduced time-stamp address.

8. The terminal as claimed in claim 7, having access to a file making each time-stamp address correspond to a physical address for the reproduced units of the series on the basis of the nominal reproduction duration; and wherein the terminal sends a request comprising the physical address corresponding to the time-stamp address determined.

9. A system for management of digital content over a network comprising a terminal as claimed in claim 7 and a server designed to cooperate with said terminal; said server carrying out a method comprising:

receiving a message for a request for data indicating addresses;

determining data of the digital content as a function of the addresses indicated in the request message; and transmitting the determined data to said terminal.

10. The terminal of claim 7, wherein the terminal performs further steps comprising:

using the requested data to guarantee that the modification of the nominal reproduction duration corresponds to the modification factor associated with the trick mode.

11. A non-transitory computer readable storage medium storing a program comprising instructions which, when executed by a processor, implements the method as claimed in claim 1.

* * * * *